United States Patent
Underwood

(10) Patent No.: US 6,705,215 B2
(45) Date of Patent: Mar. 16, 2004

(54) CARPET SEAM PRESS

(76) Inventor: Patrick Underwood, 12044 Royal Rd. Space 78, El Cajon, CA (US) 92021

( * ) Notice: Subject to any disclaimer, the term of this patent is extended or adjusted under 35 U.S.C. 154(b) by 0 days.

(21) Appl. No.: 10/138,682

(22) Filed: May 3, 2002

(65) Prior Publication Data

US 2003/0205149 A1 Nov. 6, 2003

(51) Int. Cl.$^7$ .......................... B30B 15/34; B29C 65/00
(52) U.S. Cl. .................... 100/38; 156/304.4; 156/304.7
(58) Field of Search ................... 100/38, 99; 156/304.1, 156/304.3, 304.4, 304.6, 304.7, 311, 498, 544, 379; 38/74, 77.6

(56) References Cited

U.S. PATENT DOCUMENTS

| | | | | |
|---|---|---|---|---|
| 4,671,977 A | * | 6/1987 | Berry | 428/62 |
| 4,699,686 A | * | 10/1987 | Franke | 156/579 |
| 5,089,080 A | * | 2/1992 | Ramirez et al. | 156/498 |
| 5,250,139 A | * | 10/1993 | Hall | 156/379 |
| 5,876,278 A | * | 3/1999 | Cheng | 454/184 |
| 2002/0170658 A1 | * | 11/2002 | Bennett | 156/229 |

* cited by examiner

Primary Examiner—Allen Ostrager
Assistant Examiner—Jimmy T Nguyen
(74) Attorney, Agent, or Firm—Steins & Associates, P.C.

(57) ABSTRACT

A Carpet Seam Press is disclosed. The press includes means for cooling and pressing a recently-formed seam between two adjoining sections of carpet. The press further includes a light projecting from at least one end for illuminating confined work areas. The press also includes a bottom plate having several small holes formed in it and fans for forcing air through those holes and onto the seam being pressed and cooled. Further yet, the press may provide an electrical convenience outlet to eliminate the need for more than a single extension cord.

10 Claims, 5 Drawing Sheets

CARPET SEAM PRESS

BACKGROUND OF THE INVENTION

1. Field of the Invention

This invention relates generally to tools for assisting in flooring installation and, more specifically, to a Carpet Seam Press.

2. Description of Related Art

A critical component of the installation process for conventional carpeting (and other sheet-type flooring) involves the completion of a seam between two adjoining sections or sheets of carpet (or other flooring). Sections of carpet are joined together where one section, by itself, is insufficient to cover the entire floor space of a particular room or series of rooms. In such cases, two carpet sections are typically joined by a seam in some inconspicuous place, such as in a doorway or archway. Although the location of the seam can assist in hiding it from being detected, it is also important that the patterns of the two sheets of carpet match, and also that the seam is extremely flat and smooth. If we turn to FIG. 1, we can examine how the conventional seaming process is implemented.

FIG. 1 is a perspective view of the conventional carpet seaming process. As shown, a first carpet section 10 and a second carpet section 12 are joined together to form a seam 14 between the two. The seam 14 is generally created by placing segments 10 and 12 in close alignment, such that the edges 16 and 18 of the sections 10 and 12 are touching each other along their lengths. Beneath the edges 16 and 18 (placed there prior to the edges being carefully aligned) is a length of seam tape 20. The seam tape 20 is made from a material that, when pressed by a heated tool, will melt and/or otherwise adhere the two sections 10 and 12 together, forming a smooth seam 14. Although it is also possible that the sections 10 and 12 will also be sown together, in these cases, the seam 14 will first be formed with the seam tape 20, and then be sown.

In order to cause the seam tape 20 to adhere the two sections 10 and 12 together, it is common for the installation person to use a conventional clothes iron 22. The iron 22 will typically include an electric cord 24 that is plugged into a wall socket or extension cord (not shown), until it reaches the desired temperature. Next, the iron 22 is slipped under the edges 16 and 18 and onto seam tape 20, and held there until the seam tape 20 reacts to become sticky. Once a particular section of tape 20 becomes sticky, the iron 22 is moved to the next section; when the iron 22 is moved, the two edges 16 and 18 drop onto the sticky seam tape 20, where they are bonded (once the tape 20 cools). The iron 22 is then slowly slid down the length of the edges 16 and 18 of the sections 10 and 12 until the entire seam 14 is formed.

In order to prevent the edges 16 and 18 from curling up after the seam tape 20 has begun bonding and the iron 22 has been slid to the next portion to be seamed, the installation person will many times use some weighted object to briefly press and hold down the edges 16 and 18 until such time as the seam tape 20 cools enough to make the seam 14 complete. Frequently the weighted object that the installation person chooses to use is a masonry brick wrapped in a protective sheet, such as aluminum foil or plastic wrap. The problem with this approach is that the wrapped brick tends to heat up with continued use, making it less and less effective at cooling the seam down quickly. What is needed is a seam pressing device that actually assists in cooling down the carpet seam 14 during the seaming process.

SUMMARY OF THE INVENTION

In light of the aforementioned problems associated with the prior devices and methods, it is an object of the present invention to provide a Carpet Seam Press. It is a further object that the press include means for cooling and pressing a recently-formed seam between two adjoining sections of carpet. The press should further include a light projecting from at least one end for illuminating confined work areas. Still further, it is an object that the press include a bottom plate having several small holes formed in it and fans for forcing air through those holes and onto the seam being pressed and cooled. It is a further object that the press provide an electrical convenience outlet to eliminate the need for more than a single extension cord.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Carpet Seam Press.

Figure 1:
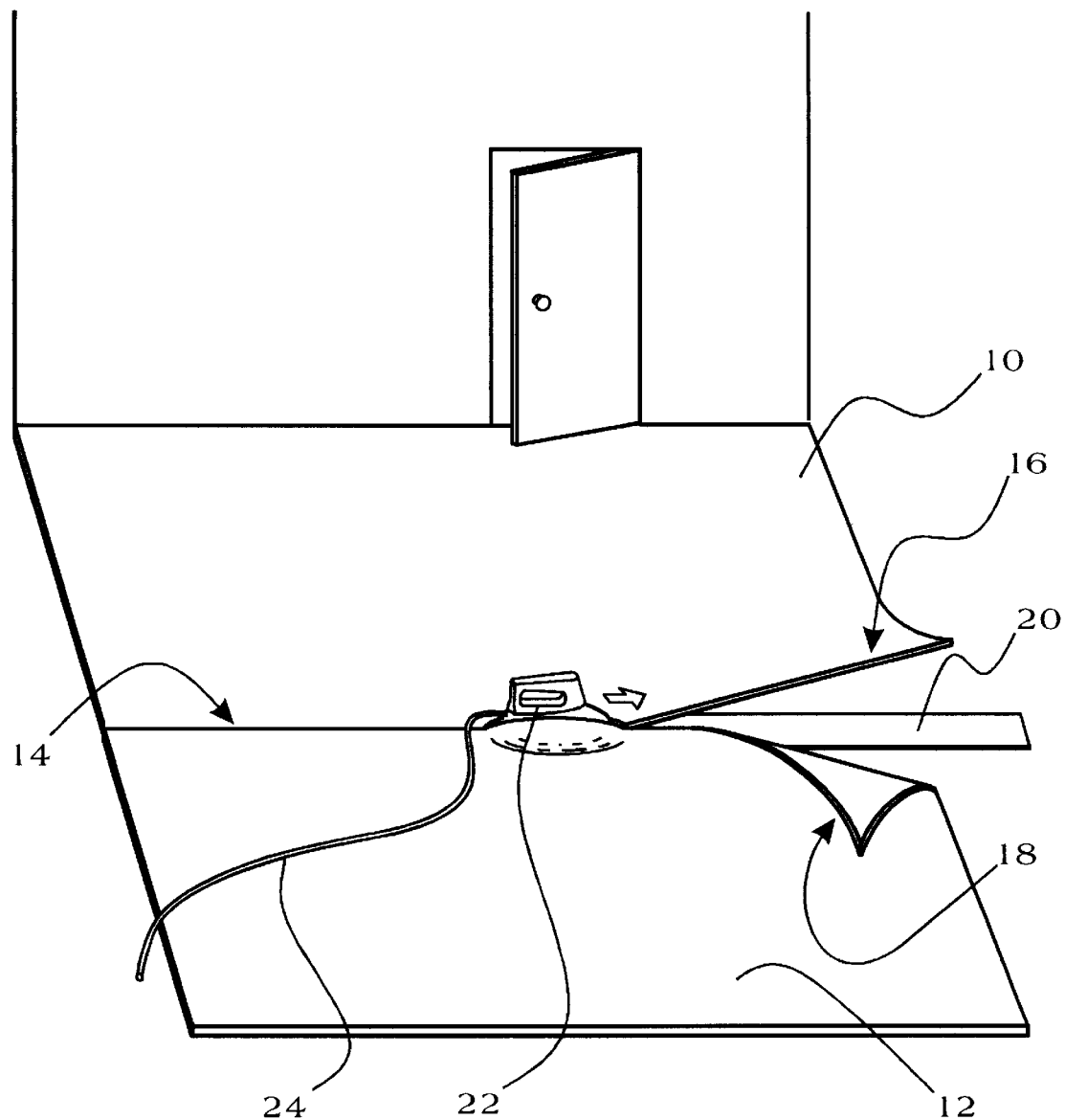
FIG. 1 is a perspective view of the conventional carpet seaming process.
Figure 2:
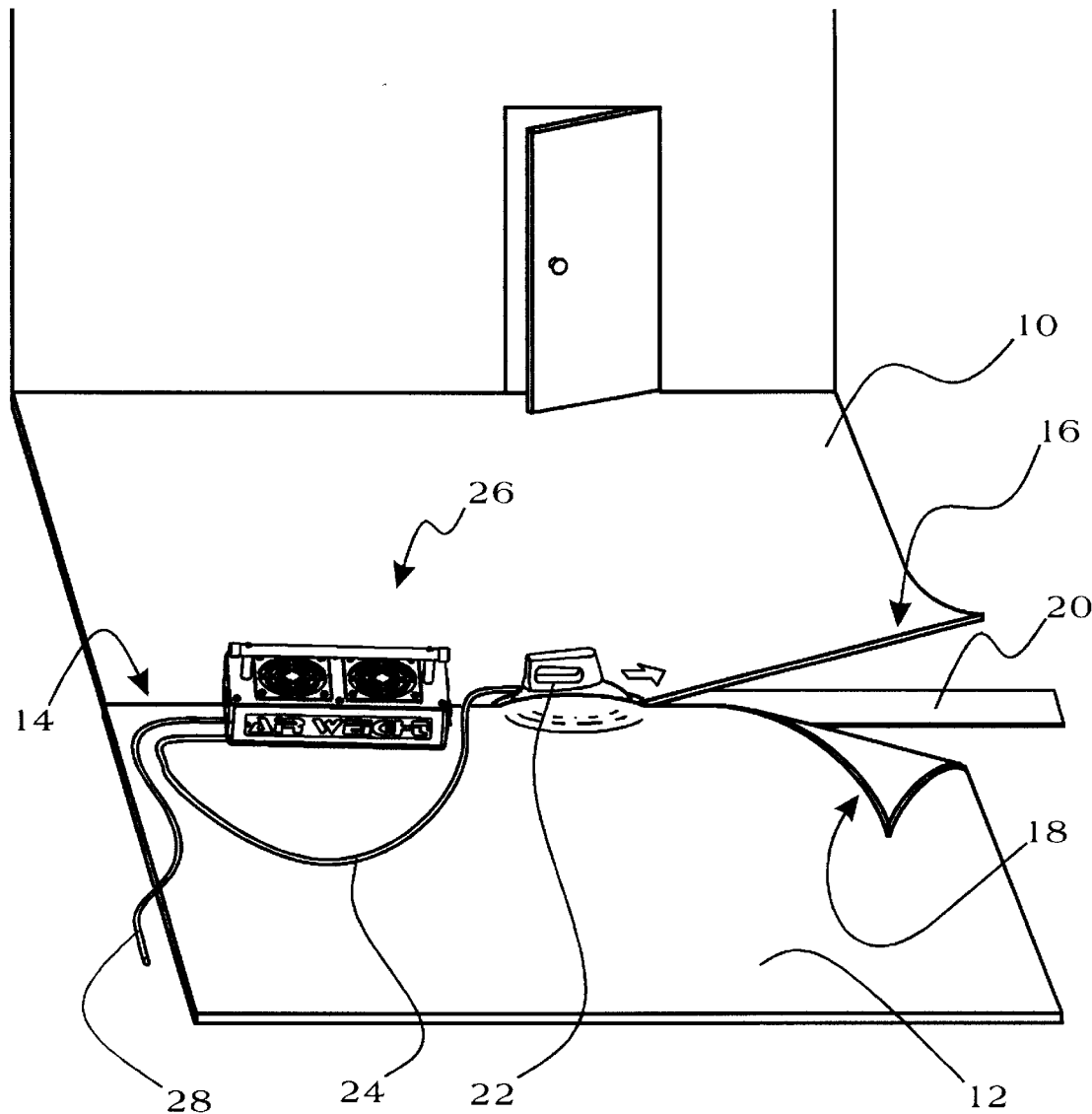
FIG. 2 is a perspective view of a preferred embodiment of the carpet seaming process of the present invention.

The present invention can best be understood by initial consideration of FIG. 2. FIG. 2 is a perspective view of a preferred embodiment of the carpet seaming process of the present invention. One change from the prior process to that process depicted here is the addition of the carpet seam press 26. The seam press 26 is designed to be pressed onto the heated seam 14 between the two carpet sections 10 and 12; the press 26 will briefly press the edges 16 and 18 down onto the seam tape 20, while simultaneously cooling the seam 14. As the seam press 26 is moved along behind the iron 22, it will create a tight, well-bonded seam.

As is also depicted in FIG. 2 (and discussed further below in connection with FIGS. 3 and 4), is another unique aspect of the press 26; its integrated convenience outlet (not shown). The convenience outlet is an outlet configured to accept a conventional 120VAC plug; it is powered by the same power source that provides power for the press 26. The convenience outlet provides the user with the ability to plug the iron 22 directly into it, rather than to a wall socket and/or extension cord. As a result, the user need only provide power in one place (to the press 26), rather than two; this will serve to minimize the number of cords passing across the carpet work area, thereby minimizing their interference with work progress. If we now turn to FIG. 3, we can examine the seaming press 26 in more detail.

Figure 3:
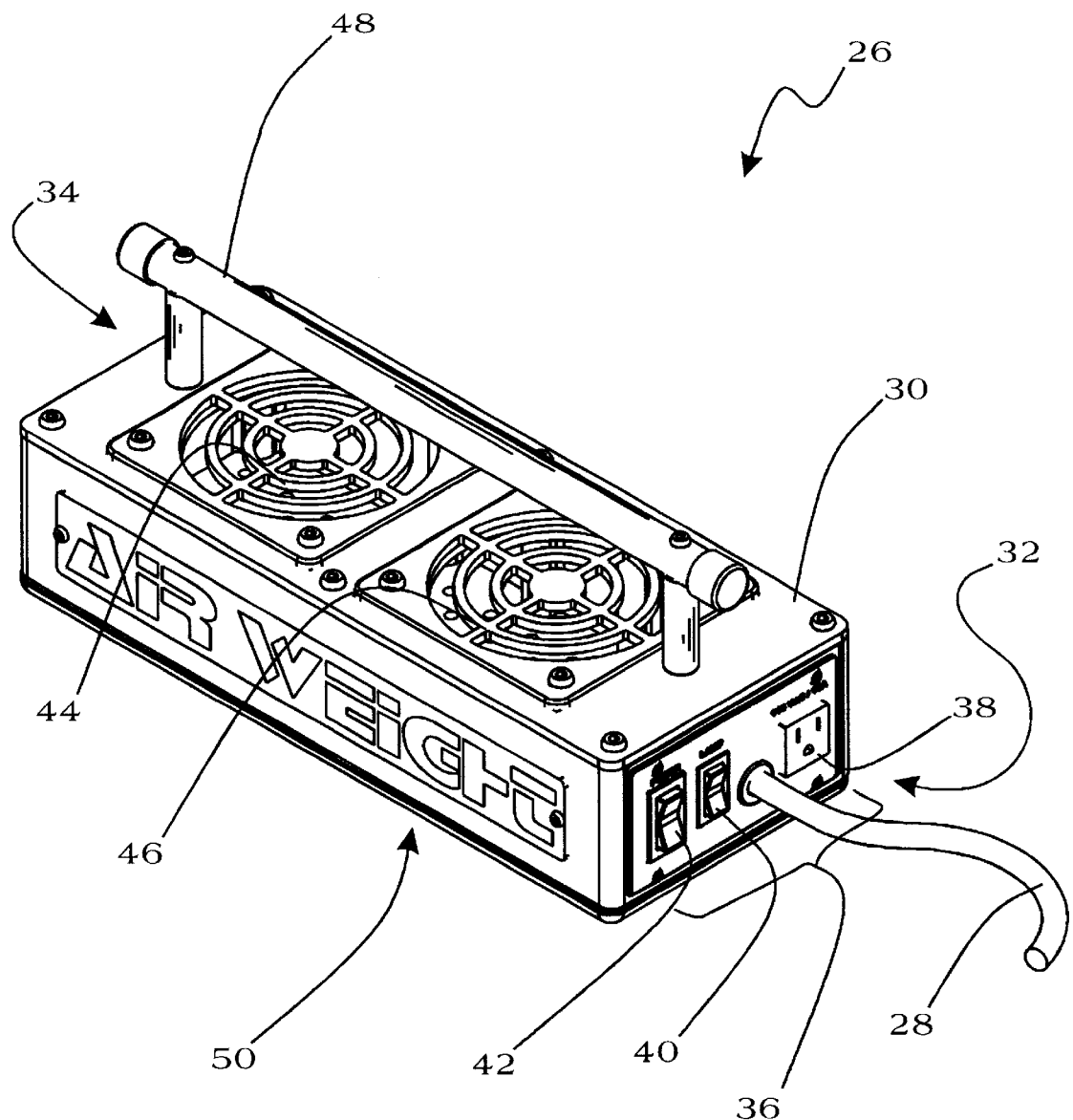
FIG. 3 is a perspective view of the control panel end of the seam press of FIG. 2.

A preferred embodiment of the seaming press 26 of the present invention is displayed in the perspective view shown in FIG. 3. The press 26 comprises a housing 30, defined by a control end 32 and a lamp end 34. In this example, the control end 32 includes a control panel 36 for operating the electrical components of the press 26, and from which extends the electrical power cord 28. Disbursed across the face of the control panel 36 are also found a convenience electrical outlet 38, such as for plugging the iron (see FIG. 2) into. As discussed above in connection with FIG. 2, this convenience outlet 38 enables the installation person to only locate a single remote power source; by plugging the iron (see FIG. 2) into the outlet 38, the iron's cord is kept close at hand, rather than being extended across the room and/or work surface.

Also found on the control panel 36 are a light switch 40 for operating the internal work light that will be discussed further below in connection with subsequent figures. Further found on the control panel 36 is a fan switch 42 for operating the two cooling fans 44 and 46 that are disposed on the top surface of the housing 30. The cooling fans 44 and 46 will preferably provide downward airflow into the housing 30, such that a positive pressure is created therein. The air will flow through the internal volume of the housing and out through a plurality of apertures formed in the bottom plate 50 of the press 26; further detail of this feature is provided below in connection with subsequent drawing figures. The fan switch permits the user to turn the fans 44 and 46 on and off while leaving the press 26 (and the iron plugged into the outlet 38) plugged in to the electrical power source. As was discussed above in connection with FIG. 2, the press 26 is slid by the user along the recently-formed carpet seam behind the seaming iron; this is facilitated by the handle 48 extending upwardly from the housing 30. If we now turn to FIG. 4, we can examine further detail regarding the press 26 of the present invention.

Figure 4:
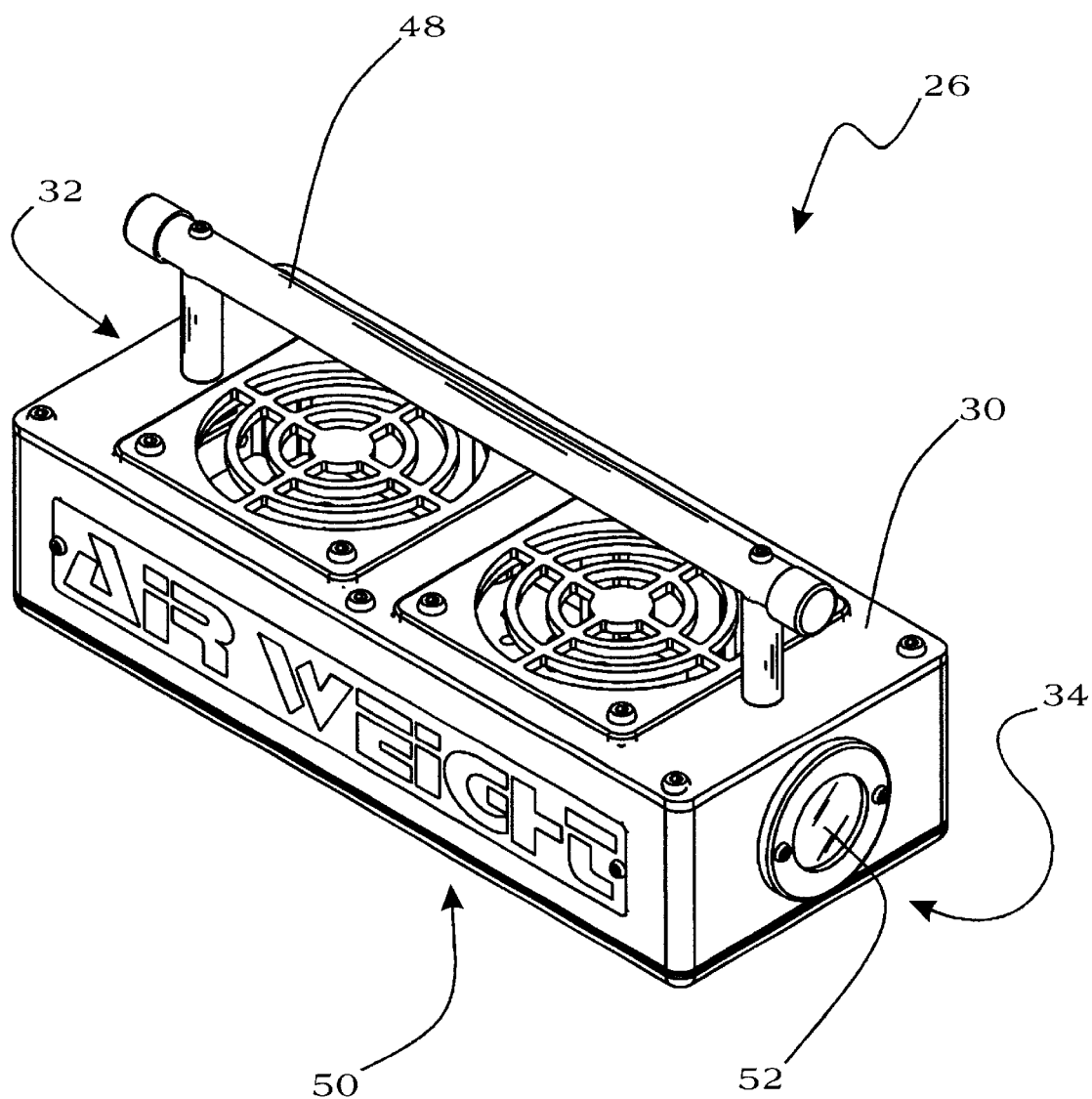
FIG. 4 is a perspective view of the lamp end of the seam press of FIGS. 2 and 3.

FIG. 4 is a perspective view of the seam press 26 of FIGS. 2 and 3. In this view, the detail of the lamp end 34 of the press 26 is shown. Disbursed on the lamp end 34 is one or more work lamps 52, or other lighting devices. The lamp 52 is provided to give the user additional lighting upon the seam area, such as when the user is creating a seam in a confined and/or poorly lighted area. In order to operate the light, the user need simply to switch on or off the light switch (see FIG. 3) when additional light is or is not needed. Now turning to FIG. 5, we can discuss additional structure features of this particular press 26 design.

Figure 5:
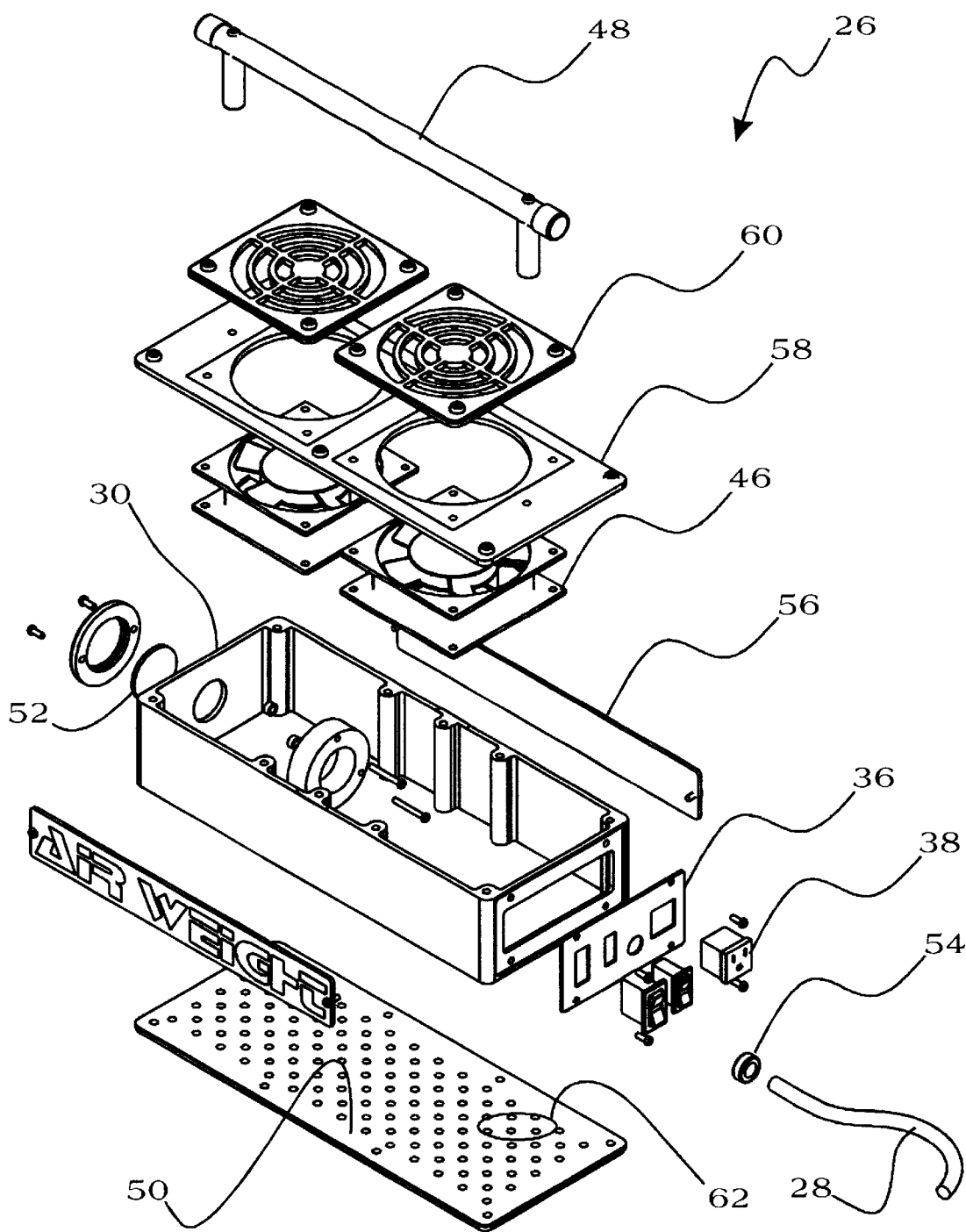
FIG. 5 is an exploded perspective view of the seam press of FIGS. 2–4.

FIG. 5 is an exploded perspective view of the seam press of FIGS. 2–4. It should be understood that the shape and composition of the elements shown here are only those necessary for assembling the embodiment shown in the previous FIGS. 2–4. As shown, the housing 30 comprises a top plate 58 and a bottom plate 50. The bottom plate 50, very importantly, is preferably defined by several apertures or perforations across its face. These perforations 62 are provided to permit air flow entering through the cooling fans 44 and 46 to pass through the substantially hollow housing 30 and out through the bottom plate 50. This constant flow of air out the perforations 62 will provide a substantial cooling effect in any area upon which the press 26 is placed (i.e. on a newly ironed seam), causing the seam to set (become hardened) more quickly than by simply allowing it to air cool. It might further be desired that the bottom plate 50 have its bottom surface coated with a non-stick material, in order that it resist sticking to the melted seam tape. In other embodiments, the bottom plate 50 might be constructed without perforations 62, but might be made from some heat-sinking material and/or heat-sinking cross-section such that the air flow from the cooling fans 44 and 46 simply cool the bottom plate 50; the elimination of the perforations 62 would make the surface even more impervious to becoming soiled with glue or other materials.

On each side of the housing 30 may be found side plates 56, such as those shown for displaying trademark indicia and/or instructions thereon. Further shown is the lamp assembly 52 that is attached to the lamp end of the housing 30. In this embodiment, the lamp assembly 52 is a single light that is configured to shine through an aperture formed in the end of the housing 30; other designs are conceived, including multiple lamps and/or surface-mounted designs.

The cooling fans 44 and 46 are attached to the bottom side of the top plate 58 (which in turn attaches to the top of the housing 30). The fans 44 and 46 are positioned cooperatively to align with two like-sized holes formed in the top plate 58, and over which are attached grill assemblies 60. The grill assemblies 60 may further include filters for filtering out airborne contaminants; in this case, the grill assemblies 60 would be easily removable from the press 26, such that filter maintenance might be performed.

As also shown, the control panel 36 attaches to the control end of the housing 30. The convenience outlet 38, switches, and power cable 28 further extend therefrom. As a further added safety measure, a strain relief grommet 54 might be added to the power cable 28 in order to inhibit the possibility that the cable 28 might be inadvertently yanked out from the press 26 (such as if someone trips over it).

Finally, the handle 48 will be configured to attach to either the top plate 58 or the housing 30, depending upon the particular design and its aesthetic or utility particulars.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for creating a seam between a pair of sections of sheet flooring, each said section defined by an edge to be seamed, the method comprising:

placing said sections whereby said edges are aligned and substantially touching along their length;

placing seaming tape beneath said aligned edges;

placing a heated iron over one portion of said seaming tape until said tape is sticky;

moving said heated iron away from said sticky portion; and placing a cooling press device onto said sheet flooring directly above said sticky portion until said seaming tape has cooled and substantially set said cooling press device comprising a housing defined by a top surface, a bottom surface and defining an inner chamber, and at least one cooling fan attached to said housing for forcing air into said inner chamber and onto said bottom surface.

2. The method of claim 1, wherein said cooling press device placing step comprises placing said cooling press device wherein said bottom surface comprises a bottom plate, said bottom plate defined by a plurality of perforations funned therethrough.

3. The method of claim 2, wherein said cooling press device placing step comprises placing said cooling press device wherein said housing is further defined by a light end and a control panel end.

4. The method of claim 3, wherein said cooling press device placing step comprises placing said cooling press device wherein said light end is further defined by a light, said light projecting light therefrom.

5. The method of claim 3, wherein said cooling press device placing step comprises placing a cooling press device wherein said control panel end is further defined by a convenience outlet disbursed thereon, a switch for activating said fans, and a switch for activating said light.

6. A method for creating a durable seam between two adjacent sections of carpeting, each said section defined by an edge to be seamed, the method comprising:

placing said sections whereby said edges are aligned and substantially touching along their length;

placing seaming tape beneath said aligned edges;

placing a heated iron over one portion of said seaming tape until said tape is sufficiently heated;

moving said heated iron away from said sufficiently heated portion; and placing a cooling press device onto said sections directly above said sufficiently heated portion until said seaming tape has cooled and substantially set, said cooling press device comprising a housing defined by:

an inner chamber;

a bottom plate defined by a plurality of apertures formed therein; and at least one cooling fan oriented for operatively drawing ambient air surrounding said housing into said inner chamber and out through said apertures.

7. The method of claim 6, wherein said cooling press device placing step comprises placing said cooling press device wherein said device further comprises an accessory outlet attached to said housing.

8. The method of claim 7, wherein said cooling press device placing step comprises placing said cooling press device wherein said device further comprises a light attached to said housing, said light oriented to project light in a spacial volume outside said inner chamber.

9. The method of claim 8, wherein said cooling press device placing step comprises placing said cooling press device wherein said device further comprises a light switch attached to said housing for operating said light.

10. The method of claim 9, wherein said cooling press device placing step comprises placing said cooling press device wherein said device further comprises a fan switch attached to said housing for operating said at least one fan.

\* \* \* \* \*